(12) United States Patent  
Huang

(10) Patent No.: US 9,404,744 B2  
(45) Date of Patent: Aug. 2, 2016

(54) SYSTEM AND METHOD FOR A HANDHELD CURRENT PROFILER

(71) Applicant: Teledyne RD Instruments, Inc., Poway, CA (US)

(72) Inventor: Hening Huang, San Diego, CA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/609,173

(22) Filed: Jan. 29, 2015

(65) Prior Publication Data

US 2015/0226588 A1  Aug. 13, 2015

Related U.S. Application Data

(60) Provisional application No. 61/937,339, filed on Feb. 7, 2014.

(51) Int. Cl.
| | |
|---|---|
| *G01S 1/72* | (2006.01) |
| *G01C 13/00* | (2006.01) |
| *G01S 15/08* | (2006.01) |
| *G01S 15/58* | (2006.01) |
| *G01S 15/60* | (2006.01) |
| *G01S 15/87* | (2006.01) |
| *G01S 15/02* | (2006.01) |

(52) U.S. Cl.
CPC .............. *G01C 13/008* (2013.01); *G01S 15/08* (2013.01); *G01S 15/588* (2013.01); *G01S 15/60* (2013.01); *G01S 15/87* (2013.01); *G01S 15/025* (2013.01)

(58) Field of Classification Search
USPC .......................................... 73/861.18; 367/90
See application file for complete search history.

(56) References Cited

U.S. PATENT DOCUMENTS

| | | | |
|---|---|---|---|
| RE35,535 E | 6/1997 | Brumley et al. | |
| 6,052,334 A * | 4/2000 | Brumley | G01C 13/002 367/90 |
| 7,911,880 B2 * | 3/2011 | Lohrmann | G01S 7/523 367/90 |
| 8,125,849 B2 * | 2/2012 | Cabrera | G01F 1/663 367/87 |
| 8,254,208 B2 * | 8/2012 | Vogt | G01C 13/00 367/88 |

* cited by examiner

*Primary Examiner* — Jewel V Thompson

(74) *Attorney, Agent, or Firm* — Knobbe, Martens, Olson & Bear, LLP

(57) ABSTRACT

A handheld current profiler (HCP) system and method for wading discharge measurement is disclosed. The disclosed HCP has dual capabilities. It serves as a single point current meter that can measure velocity in as little as 3 cm of water. It becomes a current profiler with an additional near surface velocity measurement cell in water about 15 cm or deeper. The HCP has a surface tracking acoustic beam that measures the water level. Thus, in most cases, no manual measurements for water depth and transducer depth are required because both depths may be measured acoustically. In addition, the disclosed HCP can have a very small transducer with a form factor which can lead to minimum flow disturbance.

12 Claims, 5 Drawing Sheets

SYSTEM AND METHOD FOR A HANDHELD CURRENT PROFILER

CROSS-REFERENCE TO RELATED APPLICATIONS

This application claims the benefit under 35 U.S.C. §119(e) of U.S. Provisional Application No. 61/937,339, filed Feb. 7, 2014, the disclosure of which is herein incorporated by reference in its entirety.

BACKGROUND

1. Field

The disclosed technology relates to underwater acoustic measurement systems and, more particularly, to a handheld current profiler (HCP) which is capable of taking both single-point and profiling measurements, and has a surface tracking beam and bottom tracking beams.

2. Description of the Related Technology

An important category of scientific instrumentation relates to precision underwater acoustics. With advanced transducers that transmit sound pulses and receive resulting echoes, water velocities in individual cells in a water column can be measured. This type of measurement is known in the industry as a current profile. As described in U.S. Pat. No. 6,052,334 the use of Doppler sonar to measure currents in a fluid medium is well-established. For example, the Teledyne RD Instruments StreamPro ADCP product includes a shallow streamflow measurement system based on ADCP technology. U.S. Pat. No. RE 35,535 discloses a broadband acoustic Doppler current profiler (ADCP). These patent documents are hereby incorporated by reference in their entirety.

In shallow streams or creeks, a single-point current meter, mounted on a wading rod, is still the dominant instrument for discharge measurement. Using this type of instrument, the overall discharge is estimated by taking velocity measurements at a plurality of locations across the stream or creek. At each location, one or more velocity measurements are taken along the same vertical line at varying depths in the water, with the number of measurements and their depth being dependent upon the overall depth of the water. In recent years, acoustic Doppler single-point current meters are replacing conventional mechanical current meters for wading discharge measurement. An acoustic Doppler current meter usually has one or two horizontal beams. Thus, it can measure velocity in water as shallow as 3 cm. However, using a single-point current meter, either a conventional mechanical meter or an acoustic Doppler current meter, is essentially a manual operation. At each measurement location, an operator needs to read the water depth from the wading rod scales and manually adjust the sensor height, at least once (one-point method) and up to five times (five-point method), depending on the water depth. Thus, the measurement using a single-point current meter is time consuming and only collects limited data.

Existing single point acoustic Doppler meters include the SonTek Flowtracker, an acoustic Doppler single point current meter, the OTT ADC acoustic Doppler single point current meter and the SEBA AquaProfiler-M acoustic Doppler single point current meter.

A traditional down-looking ADCP (acoustic Doppler current profiler) that measures velocity profile in a water column may be an alternative to single-point current meters for wading discharge measurement. However, most ADCPs on the market are not designed for wading discharge measurement; they are not suitable for very shallow streams or creeks, say, in a depth range from 3 cm to 30 cm. This is because (1) the ADCP mounting depth and blanking would result in a significant unmeasured surface layer, and (2) the side lobe effect would result in a significant unmeasured bottom layer. In addition, flow disturbance associated with the traditional ADCPs may become significant in shallow waters. A specially designed wading rod ADCP, called AquaProfiler-M-Pro, is now available on the market. An AquaProfiler-M-Pro has a small transducer mounted on the end of a wading rod. During operation, the transducer is placed on the bottom and looks up. However, such a product still cannot make velocity profile measurements in water less than 15 cm due to the transducer thickness, blanking near the bottom, and the side lobe effect near the water surface. Even in deep water, this product is unable to measure velocity close to the water surface due to the side lobe effect. In addition, flow disturbance is also a problem since it may push the first measurable cell further way from the transducer.

SUMMARY OF CERTAIN INVENTIVE ASPECTS

The system, method, and computer-readable media of the invention each have several aspects, no single one of which is solely responsible for its desirable attributes. Without limiting the scope of this invention, its more prominent features will now be briefly discussed.

In one aspect, a method of measuring discharge from a moving source of water is disclosed. The method includes measuring depth at each of a plurality of vertical measurement locations. The method further includes measuring velocity data at each of the plurality of vertical measurement locations. Measuring velocity data includes selecting a manual operation mode comprising measuring a single point water velocity, in response to the measured depth below a first threshold. Measuring velocity data also includes selecting an automated operation mode comprising measuring a velocity profile, in response to the measured depth greater than or equal to the first threshold. The method further includes recording the velocity data and depth measured at each of the plurality of vertical measurement locations. The velocity data includes the single point water velocity and/or the velocity profile. The method further includes calculating discharge based on the recorded velocity data and depth.

In another aspect, a system for underwater measurement is disclosed. The system includes a transducer head configured to generate a plurality of beams, the transducer head configured to measure water depth, velocity at a single point, and a velocity profile. The system further includes a control unit configured to select an automatic operation mode, the control unit further configured to select a manual operation mode. The control unit is further configured to determine a plurality of profiling bins based on the water depth measurement. The control unit is further configured to record velocity and depth data. The control unit is further configured to calculate discharge based on the recorded velocity and depth data. The system further includes a wading rod coupled to the transducer head, the wading rod configured to lower the transducer head below the surface of the water.

In yet another aspect, a portable system for underwater measurement is disclosed. The portable system includes a transducer head and driver circuitry configured to generate a plurality of acoustic beams. The acoustic beams include an up-looking beam, a single cell measurement beam, and one or more down-looking current profiler beams. The portable system can be configured for single point or current profile operation depending on measured water depth.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

DETAILED DESCRIPTION OF CERTAIN ILLUSTRATIVE EMBODIMENTS

Figure 1:
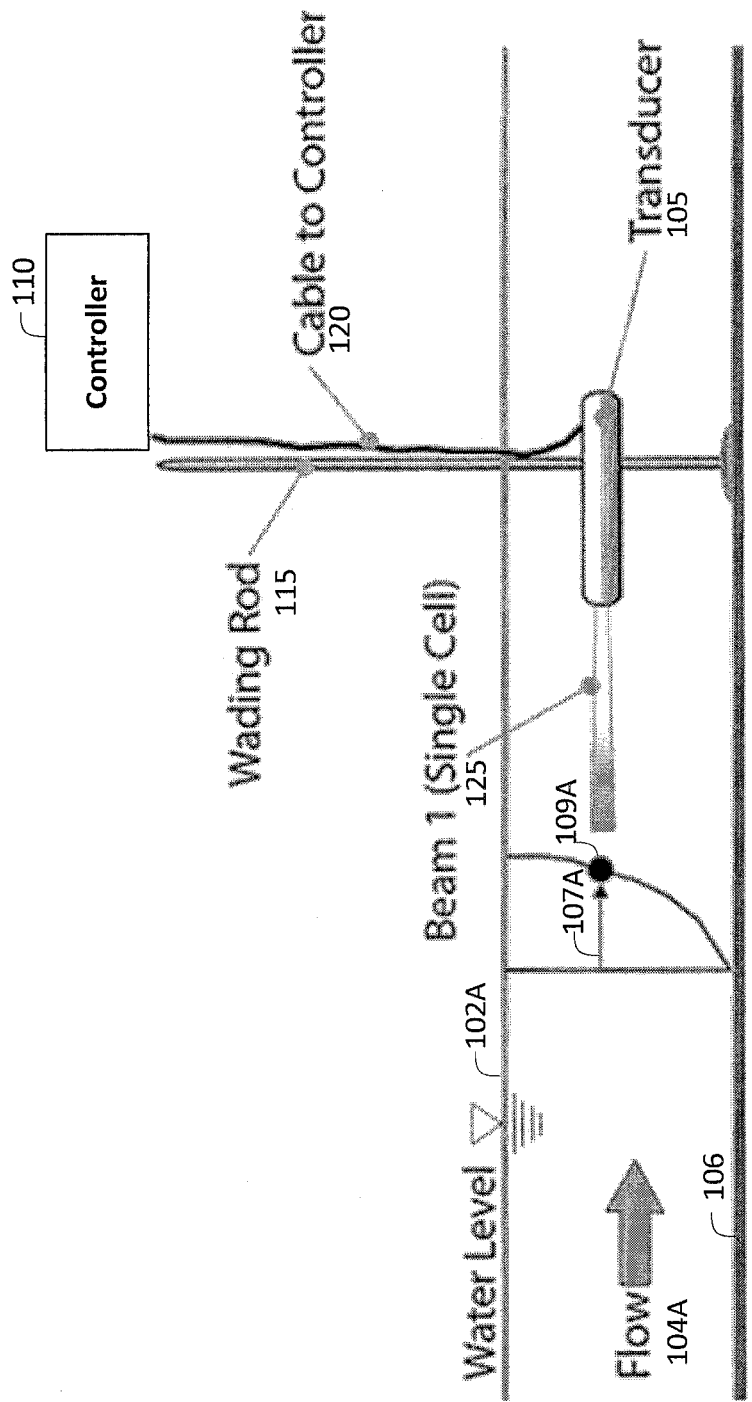
FIG. 1 is a perspective view of a handheld current profiler (HCP) operating in shallow water.

Discharge, or streamflow, may be defined as the volumetric rate of flow of a stream in an open channel. The flow of a stream may be measured in units of volume per unit time, such as cubic feet per second, acre feet per day, or gallons per day. As velocity varies across a cross section of a stream in a channel, estimating stream flow may involve dividing the cross section of a stream into segments and estimating the discharge in that segment. A segment may be referred to as a vertical, section, or partial area. The discharge in the vertical may be estimated as the product of the cross sectional area of the segment and the average flow velocity in the segment. The velocity-area method of estimating discharge estimates measures the depth of each vertical to estimate area of the vertical, and measures the velocity in the vertical. The estimated discharge in the vertical is the product of the area and the velocity of flow within the vertical. The velocity-area method estimates streamflow by summing the discharge estimates for all the verticals in a cross section of the stream. A midsection method of estimating discharge measures the velocity at one or more selected points in the vertical to estimate velocity in the vertical. These and other methods of measuring discharge involve estimating currents and current profiles.

Acoustic Doppler current profilers (ADCPs) transmit acoustic pulses along a narrow beam from each of multiple transducers. As the pulses travel through the water column, they strike scatterers, such as suspended sediment and organic particles that reflect some of the acoustic energy back to the ADCP, which receives and records the reflected pulses. The reflected pulses are received over an interval of time, which individual instances of time corresponding to different ranges or depths. Range gating the return signals into depth cells makes it possible to associate a portion of a return with a depth cell. The frequency shift of the return signal due to the Doppler shift is proportional to the velocity of the scatterers relative to the ADCP along each beam. The beams are at a known orientation (for example, 30 degrees) relative to the transducer emitting and receiving the acoustic signals; therefore, trigonometric relationships may be used to compute three-dimensional water velocity vectors for each depth cell.

Broadband ADCPs use phase-coded pulses, enabling multiple independent measurements of velocity with a single broadband pulse of the same length as a narrowband pulse. By averaging independent measurements, it is possible to estimate a velocity estimate with lower measurement uncertainty than is obtained with a narrowband pulse.

The disclosed technology is directed to a handheld current profiler (HCP) for wading discharge measurement. The HCP has a transducer array that has the capabilities of both single-point and profile measurements of water velocity. The transducer array will often have four acoustic beams. In an embodiment, Beam 1 is a horizontal beam. It provides a single point measurement of water velocity. Because it points horizontally (and the transducer size is very small), it may work in water as shallow as 3 cm. Beams 2 and 3 are slant beams. They provide velocity profile measurement when the water is about 15 cm or deeper; they also provide distance-to-bottom measurement in the automatic operation mode. Thus, the horizontal beam provides a single-point measurement near the water surface, which cannot be measured by the slant beams, which measure a velocity profile. The fourth beam is on the top of the transducer array and looks up. It measures the distance to the water surface. Thus, in most cases, no manual measurements for water depth and transducer depth are required because both depths are measured acoustically.

The combination of a horizontal beam, slant beams, and an upward looking beam enables multiple capabilities. The transducer array operates as a single point current meter that to measure velocity in as little as 3 cm of water, as a current profiler with an additional near surface velocity measurement cell in deeper water (for example, 15 cm or deeper), and as a surface tracker that measures the water level. The bottom and surface tracking capability make it possible to measure depths acoustically, instead of manually, in water that is sufficiently deep for bottom and surface tracking. By reducing the form factor of the transducer head, the HCP may minimize flow disturbance.

FIG. 1 is a perspective view of a handheld current profiler (HCP) operating in shallow water, as the water level 102A is, for example, under 10 cm. Water flow 104A flows to the right in FIG. 1. The HCP has a handheld controller 110, a wading rod 115, and a transducer (transducer head) 105. In shallow water, the transducer 105 generates a horizontal beam 1 (single cell) 125. As the transducer 105 is in shallow water, neither upward pointing nor downward pointing slant beams operate. The controller 110 and transducer 105 are connected by a cable 120 that carries commands and data between the controller and the transducer. In other embodiments a wireless connection may be used in place of the cable 120. The horizontal beam acts as a single point current meter 325 to measure velocity 107A at filled in circle 109A.

Figure 2:
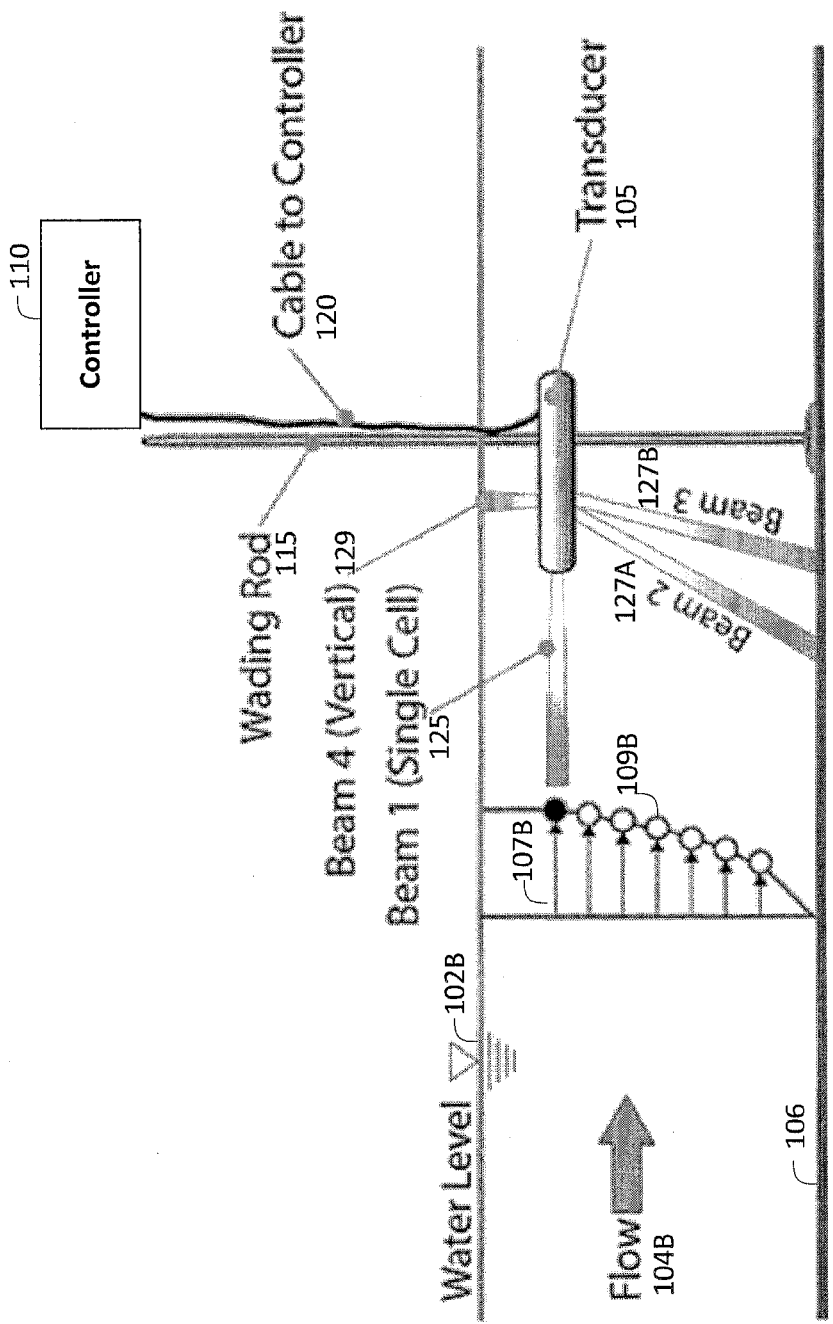
FIG. 2 is a perspective view of an HCP operating in not-so-shallow water.

FIG. 2 is a perspective view of an HCP operating in not-so-shallow water. For example the water level 102B is more than 10 cm. Water flow 104B flows to the right in FIG. 2. The HCP has handheld controller 110, wading rod 115, transducer 105, and cable 120. In addition to horizontal beam 1 (single cell) 125, as operates in shallow water, the transducer 105 transmits two slant beams 127A and 127B, and an up-looking vertical beam 4 129. The two slant beams operate at two different angles, such as 30 degrees from vertical for beam 2

127A and 15 degrees from vertical for beam 3 127B. In other embodiments, there could be additional beams, such as one or more additional slant beams or an additional vertical beam to augment the depth measurement. As in shallow water, beam 1 125 measures current corresponding to current 107B. The solid dot on the velocity profile 107A represents the single cell velocity measurement by Beam 1 (Single Cell) 125. The two or more slant beams 127A and 127B measure the current profile (velocity profile) 109B shown as a series of unfilled circles 109B. The slant beams 127A and 127B also measure depth to the bottom 106. The up-looking vertical beam 129 enables surface tracking by measuring the distance from the transducer head 105 to the water surface 102B. Thus, the water depth and the transducer depth are automatically measured by an HCP. An operator doesn't need to manually measure and enter the depths unless the water is too shallow for bottom or surface tracking.

Figure 3:
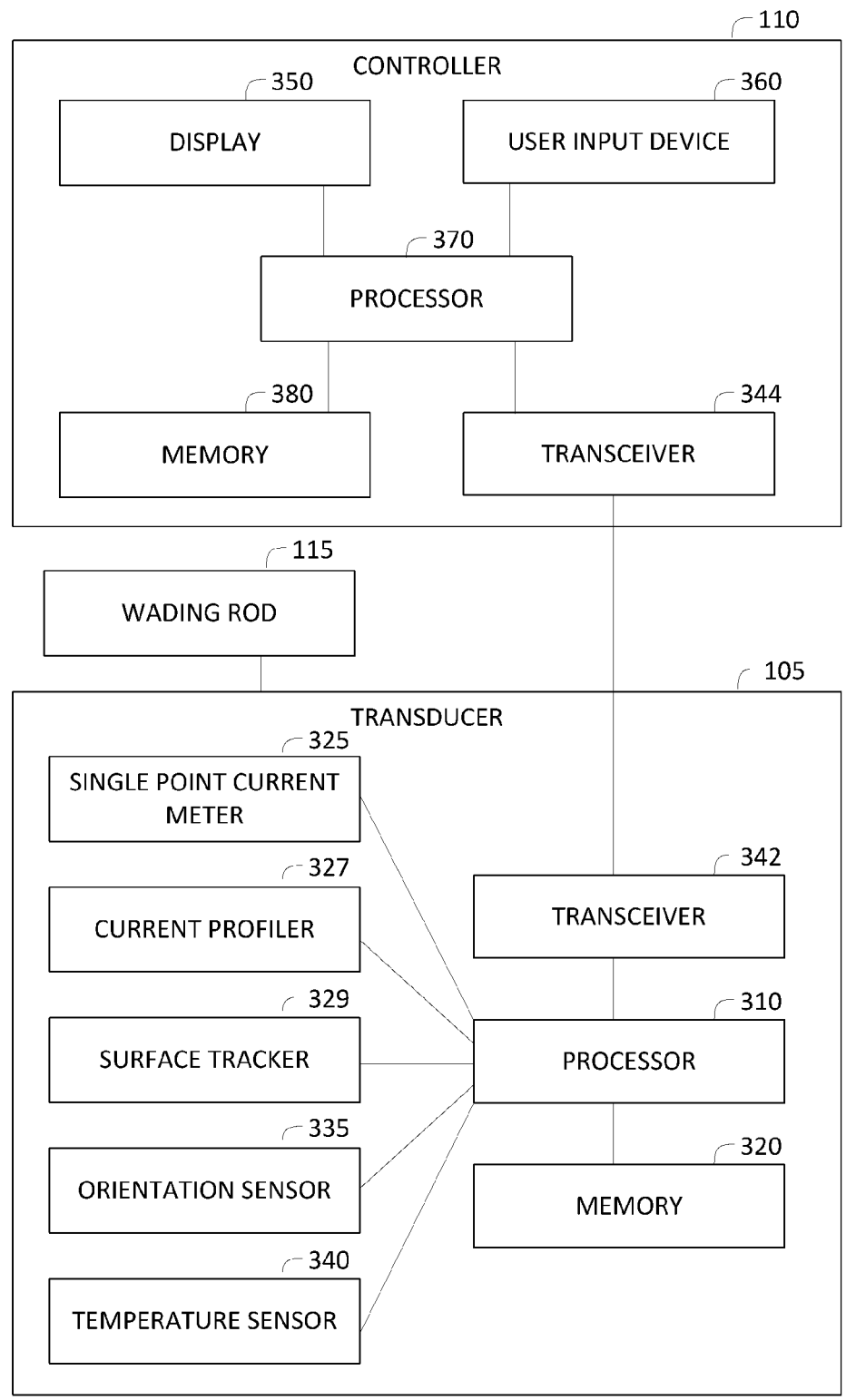
FIG. 3 is a functional block diagram of an embodiment of an HCP.

FIG. 3 is a functional block diagram of an embodiment of the HCP that operates in shallow water as illustrated in FIG. 1, or not-so-shallow water as illustrated in FIG. 2. The HCP has a transducer 105 that submerges in water to transmit and receive acoustic signals, a wading rod 115 that positions the transducer 105 in the water, and a controller 110 that controls transducer 105 operation and records information associated with discharge measurements, such as a single cell velocity, a velocity profile, depth, bottom tracking, surface tracking, or other information. The control unit 110 could be mounted on the top of wading rod 115 and connected to the transducer head 115 through a cable 120 or a wireless connection. In an embodiment, the HCP could operate at a system frequency of 5 MHz or higher.

In an embodiment, the transducer head 105 could have a diameter of up to 2 cm and a length of up to 20 cm. In an embodiment, the transducer head 105 could be made of stainless steel. In an embodiment, the transducer head 105 could have four beams 125, 127A, 127B, 129, with the beam pattern illustrated in FIG. 2, with a beam diameter of up to 0.8 cm. In an embodiment, the transducer 105 could have additional beams, such as additional slant beams pointing at a series of angles in a Janus configuration.

The transducer 105 could receive commands from, and transmit data to, the controller 110 via transceiver 342. In some embodiments, the transducer 342 could receive commands with a receiver (not shown) instead of transceiver 342, and transmit data with a transmitter (not shown) instead of transceiver 342. Communication with the controller could be wireless over a cable 120, or via wireless means.

The transducer 105 could include a processor 310 that could control operation of, and/or receive data from, the single point current meter 325, current profiler 327, surface tracker 329, orientation sensor 335, temperature sensor 340, and transceiver 342. The processor 310 could include one or more digital signal processors or dedicate electronic device.

The transducer 105 could include memory 320 that could store commands or data associated with operation of the transducer 105 elements, signal profiles, acoustic signals, timing, single cell velocity data, velocity profile data, surface tracking data, depth data, orientation data, or temperature.

The transducer 105 could include a single point current meter 325 that measures current in a single cell using a substantially horizontal beam 125. The single point current meter 325 could operate in both shallow and not-so-shallow water, in response to commands from the processor 310. In an embodiment, the single point velocity measurement cell (single point current meter) 325, corresponding to beam 1 125 in FIGS. 1 and 2, could be 0.8 cm or less in diameter, and 5 cm in length. It could be positioned approximately 10 cm from the head of the transducer 105. The single point velocity measurement cell 325 could operate in a water depth of 3 cm or more. Measured velocity could be stored in memory 320.

Figure 4:
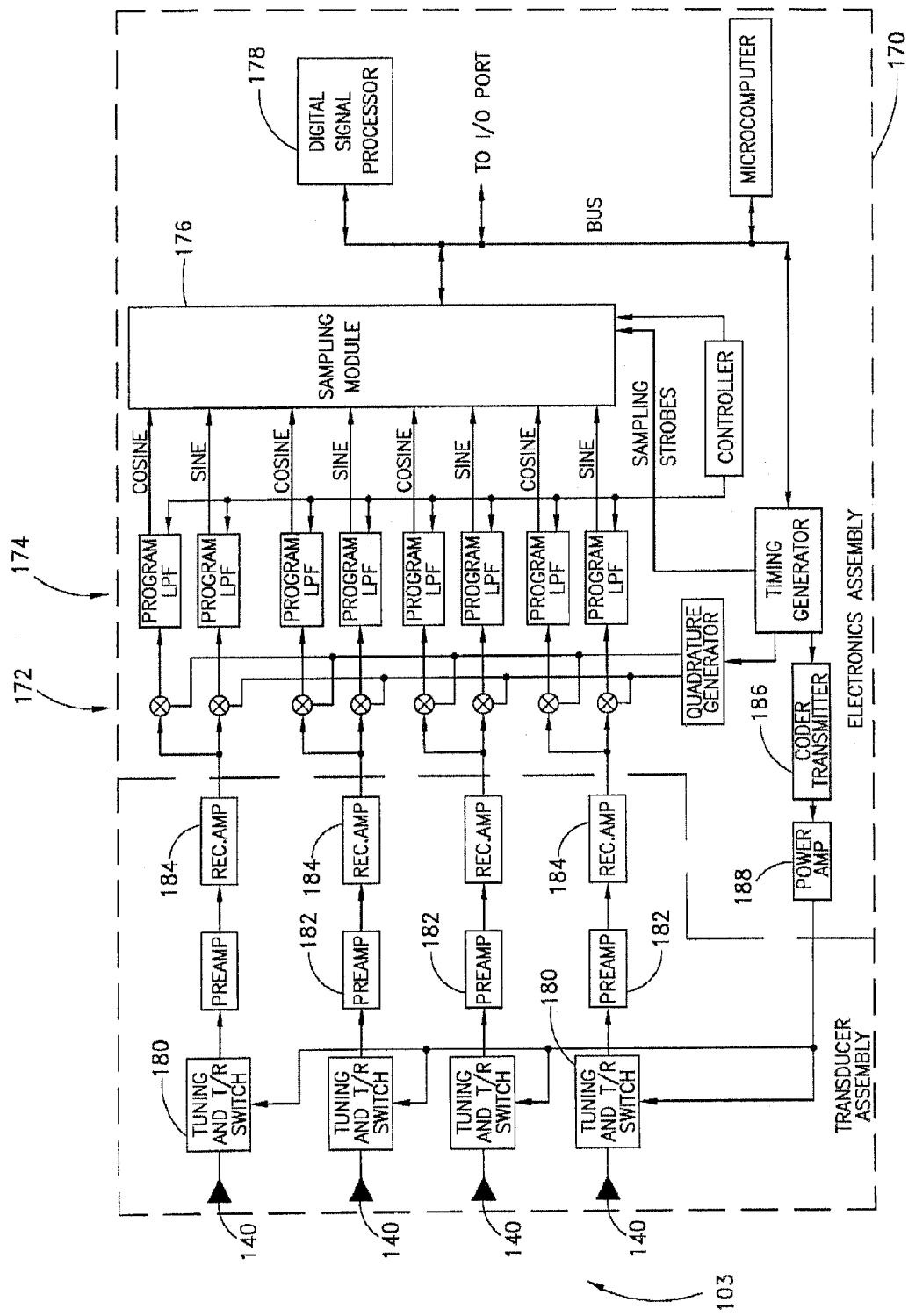
FIG. 4 is a block diagram of an exemplary embodiment of the electronics for a broadband acoustic Doppler current profiler (ADCP) of an HCP.

The transducer 105 could include a current profiler 327 that measures current profiles in not-so-shallow water. The current profiler (velocity profiler) 327 corresponding to beam 2 127A and beam 3 127 B in FIG. 2 could populate a velocity profile with, for example, 128 measurement cells of a size from 1 to 10 cm, with a minimum profiling range of about 10 cm and a maximum profiling range of about 2 m. In an embodiment, the velocity measurement could range from 0 to approximately 4 m/s, with a resolution of approximately 0.1 mm/s and an accuracy of ±1%, or ±0.25 cm/s. In an embodiment, depth, or the distance to the bottom or the surface using beam 2 127A, beam 3 127B, and/or beam 4 129, could have a range of 0.03 to 2 m, a resolution of 0.1 mm, and an accuracy of ±0.1%, or ±2 mm. The current profiler could include two or more beams, such as slant beams 127A and 127B. In some implementations, the current profiler could include downward pointing beams consistent with a Janus configuration. The current profiler could be an acoustic Doppler current profiler, an example implementation of which is illustrated in FIG. 4. The current profiler 327 could be disabled in shallow depths.

The transducer 105 could include a surface tracker 329 that measures the distance to the surface in not-so-shallow water using an upward pointing acoustic beam, such as beam 4 129 illustrated in FIG. 2. The surface tracker 329 could be disabled in shallow depths.

The transducer 105 could include an orientation sensor 335 that measures tilt, pitch, and/or roll of the transducer 105. In an embodiment, the orientation sensor 535 could have a range of ±10°, a resolution of 0.01°, and an accuracy of ±0.2 @ 0°, and ±0.5 @ 10°.

The transducer 105 could include a temperature sensor 340 that measures temperature. In an embodiment, the temperature sensor 340 could have a range of −4° C. to 30° C., a resolution of 0.1° C., and an accuracy of ±0.2° C.

The wading rod 115 could be configured to adjust the submerged depth, or height from the bottom, of the transducer 105. The transducer 105 could be attached to the wading rod 115. The wading rod 115 could rest on the bottom of the surface 106 of the stream for which discharge is being measured, and be oriented substantially vertically. In an implementation, the wading rod 115 could be attached to the controller. An operator could use the wading rod 115 to adjust depth. In an embodiment, the controller 105 could control the height of the transducer 105 using the wading rod 115.

The control unit (controller) 110 could be water resistant or water proof, and submersible to, for example, 2 m. In an embodiment, the control unit 110 could be portable for handheld operation; for example, approximately 21 cm long, 12 cm wide, and 5 cm high. The control unit 110 could include electronics, including at least one processor 370, such as a digital signal processor or a central processing unit. For some applications, the electronics could include ADCP electronics. The controller 110 could include an orientation sensor (not shown), such as a tilt sensor.

The controller 110 could include a display 350 to display menus, status information, velocity information, velocity profiles, timing information, depth data, or surface data. For an implementation, the display 350 could be an LCD, a backlit LCD, or an OLED display.

The controller 110 could include a user input device 360, such as a keypad, keyboard, touchscreen, or voice input device to accept commands or data from an operator.

The controller 110 could include a processor 370 to control operation of, and/or receive data from, display 350, user input device 360, and transceiver 344 which communicates with the transducer 105. The control unit processor 370 could operate software for system set-up, data collection, discharge calculation, and uncertainty analysis. The controller software could also enable processing and display of HCP data. The processor 370 in the controller 110 could process acoustic signals. In an embodiment, the processor 370 could process broadband and/or pulse-to-pulse coherent signals. The processor 370 could process user input data, display data, single cell velocity data, current profile data, surface tracking data, depth data, orientation data, or temperature data. The processor 370 could process control commands for the transducer 105, including modes of operation. The processor 370 could include one or more graphics processor, digital signal processor, or dedicated electronic device. The example HCP of FIG. 3 shows a processor 370 in the controller and a processor 310 in the transducer. In an implementation, processor 370 could conduct some or all of the functions described for processor 310. In an implementation, processor 310 could conduct some or all of the functions described for processor 370.

The controller 110 could include memory (memory unit) 380 for recording signals, data, and/or results. In an embodiment, the memory unit 380 capacity could exceed 1 GB. The memory 380 could store commands or data associated with operation of the controller 110 elements, display data, user input data, transducer 105 control, signal profiles, acoustic signals, timing, single cell velocity data, velocity profile data, surface tracking data, depth data, orientation data, or temperature. The example HCP of FIG. 3 shows memory 380 in the controller and memory 320 in the transducer. In an implementation, memory 380 could conduct some or all of the functions described for memory 320. In an implementation, memory 320 could conduct some or all of the functions described for memory 380.

The controller could include a transceiver 344 for communication with, for example, the transducer 105. The controller 110 could transmit commands to, and receive data from, the transducer 105 via transceiver 344. The communication could be by wire 120 using a communication protocol. The communication protocol could be RS 232 via a USB port. In some embodiments, the transceiver 344 could transmit commands with a transmitter (not shown) instead of transceiver 344, and receive data with a receiver (not shown) instead of transceiver 344. Communication with the transducer 105 could be by wire over a cable 120, or via wireless means.

The HCP could operate in a temperature range from −20° to 50° C., and operate for 25 or more hours of continuous operation. The HCP could have a power source (not shown) that includes rechargeable or alkaline batteries (for example, 9 or 12 VDC).

In one embodiment, the control unit has electronics boards inside, and a key pad and a LCD display outside. The control unit is mounted on the top of a wading rod and connected to the transducer head through a cable or a wireless connection.

The disclosed technology is directed to an HCP with dual capabilities. It serves as a single point current meter 525 that can measure velocity in as little as 3 cm of water. It becomes a current profiler (velocity profiler) 527 with an additional near surface velocity measurement cell in water about 15 cm or deeper.

Table 1 shows a non-limiting example of a configuration and specification for an HCP.

TABLE 1

Example Configuration and Specifications for an HCP embodiment
System frequency: 5 MHz or higher Transducer head:

Diameter: 2 cm or smaller
Length: 20 cm or shorter
Material: stainless steel
Number of beams: 4
Beam pattern: see FIG. 2
Beam diameter: 0.8 cm or smaller
Control unit:

Wet-proof, temporarily submersible to 2 m
Dimension: 21 cm × 12 cm × 5 cm (L × W × H)
Electronics (DSP, CPU): based on the Sperry 331 single board ADCP design
OLED display or a backlit LCD module
Keyboard or keypad
Tilt sensor
Internal recorder: >1 GB
Communication protocol: RS232, USB port to PC
Signal processing:

Broadband
pulse-to-pulse coherent
Narrowband
Single point velocity measurement cell (Beam 1):

Number: one
Size: 0.8 cm or smaller in diameter, 5 cm in length
Position: 10 cm from the transducer head
Minimum water depth: 3 cm
Velocity profile measurement cells (Beams 2 and 3):

Number: 128
Size: 1 to 10 cm
Minimum profiling range: 10 cm (have 2 good 2 cm cells)
Maximum profiling range: 2 m
Velocity measurement:

Range: 4 m/s
Resolution: 0.1 mm/s
Accuracy: ±1%±0.25 cm/s
Depth (distance to bottom or surface) measurement (Beams 2, 3, and 4):

Range: 0.03 to 2 m
Resolution: 0.1 mm
Accuracy: ±0.1%±2 mm
Tilt (pitch and roll) sensor:

Range: ±10°
Resolution: 0.01°
Accuracy: ±0.2 @ 0°, and ±0.5 @ 10°
Temperature sensor:

Range: −4 to 40 degree C.
Resolution: 0.01 degree C.
Accuracy: ±0.2 degree C.
Software:

Operation software run on the control unit for system set-up, data collection, discharge calculation, and uncertainty analysis
SxS Pro payback module for HCP data display and processing
Power:

Rechargeable or alkaline batteries: 9 or 12 VDC
Operating duration: more than 25 hours of continuous operation
Operating/Storage temperature: −20° to 50° C.

FIG. 4 illustrates an exemplary embodiment of the electronics for a broadband ADCP, such as a StreamPro ADCP sold by Teledyne RD Instruments, which can be used in connection with any of the embodiments disclosed herein. While the following discussion may refer to an ADCP system, other models and types of sonar systems, such as narrowband Doppler systems, pulse-coherent Doppler systems, or non-Doppler-based systems, may be used with the embodiments disclosed herein, depending on the particular application and needs of the user. In addition the parameters of the Doppler algorithm (for example the time lag between acoustic pulses in a broadband configuration) can be manually configured by the user or can be automatically selected by the system based upon the previous observations of the environment.

Referring again to FIG. 4, the transducer array 103 can be electrically connected to the electronics assembly 170 which can include a mixer network 172, low pass filter network 174, sampling module 176, and digital signal processor (DSP) 178. Signals generated by the transducer array elements 140 upon the receipt of acoustic signals can be fed via the transmit/receive switches 180 to preamplifiers 182 and receiver amplifiers 184, which condition and amplify the signal(s) for further processing by the electronics assembly 170. A coder transmitter 186 and power amplifier 188 can be used in conjunction with the DSP 178 to feed transmission signals to the transducer elements 140 via the transmit/receive switches 180. Thus, the same transducer elements can be used for both transmit and receive functions. Additional details regarding the exemplary broadband ADCP system are contained in U.S. Pat. No. RE35,535, "Broadband Acoustic Doppler Current Profiler" assigned to Teledyne RD Instruments, Inc., which is incorporated herein by reference in its entirety.

Figure 5:
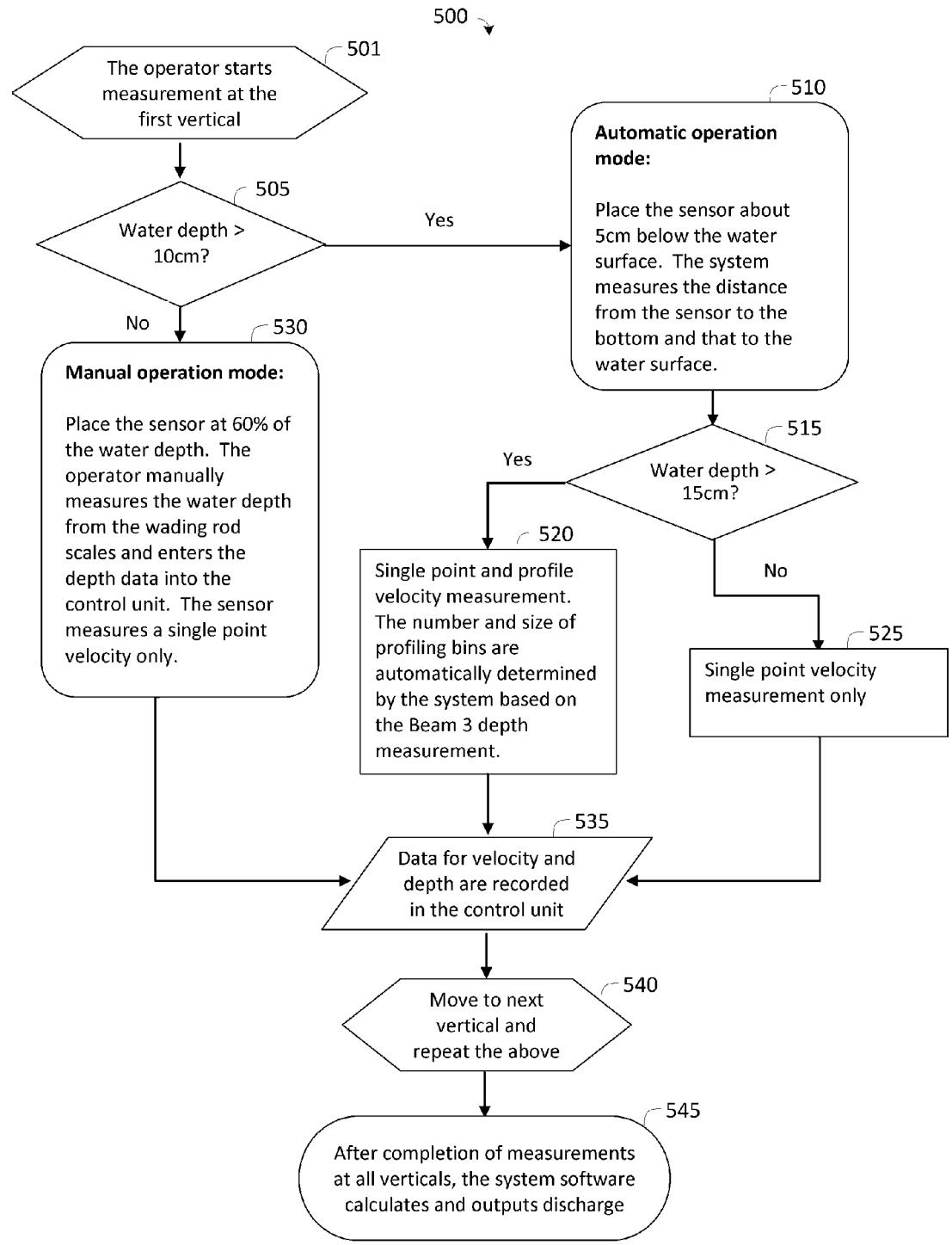
FIG. 5 is a flowchart of a process for operating an HCP according to one embodiment.

FIG. 5 is a flowchart for process 500 for operating an embodiment of HCP in the field. In various embodiments, an HCP has two operation modes, depending on the water depth at a vertical (a measurement station or referred to as a vertical measurement location). The two modes are automatic operation mode 510 and manual operation mode 530.

In block 501, the process 500 starts with measurement at the first vertical. In decision block 505, process 500 compares the water depth to 10 cm and moves to block 510, automatic operation mode, if the water depth exceeds 10 cm, but moves to block 530, manual operation mode, if the water depth is less than 10 cm.

In block 510, the process 500 places the sensor about 5 cm below the water surface. The HCP measures the distance from the sensor (transducer) to the bottom, and the distance to the water surface. In decision block 515, the process 500 compares the water depth to 15 cm and moves to block 520 if the water depth exceeds 15 cm, but moves to block 525 if the water depth does not exceed 15 cm.

In block 520, the process 500 measures both single cell velocity and a velocity profile. The process 500 automatically determines the number and size of the bins based on the depth measured by slant beam 3 127B. In block 525, process 500 measures single cell velocity using the horizontal beam 1 125, but does not measure a velocity profile.

In block 530, manual operation mode, the process 500 places the sensor at 60% of the water depth. The operator manually measures the water depth from the wading rod scales and enters the depth data in to the control unit. The sensor measures a single point velocity only.

In block 535, the control unit records data for velocity and depth. In block 540, the process 500 moves to the next vertical and shifts control to block 505, until velocity and depth are recorded for all verticals. In block 545, after completion of measurements for all verticals, the system software calculates and outputs discharge information.

The HCP may operate in automatic operation mode if the water depth at a vertical is greater than 10 cm (note: the water depth may be less than a practical depth for wading measurement, say 1.2 m). No manual measurement of sensor depth or water depth is needed. The HCP will measure a single point velocity near the water surface. If the distance from the sensor to the bottom is greater than 10 cm (or the water depth is greater than 15 cm), the HCP will measure velocity profile in addition to the surface velocity measurement. The number and size of profiling bins will be automatically determined based on the Beam 3 depth measurement.

The HCP may operate in manual operation mode if the water depth is less than 10 cm (note: the water depth may be greater than the sensor size limit, say, 3 cm). In manual operation mode, the HCP only measures a single point velocity. For example, the sensor may be placed at 60% of the water depth (e.g., for 10 cm deep water, place the sensor at 6 cm below the surface). In this situation, the operation of an HCP may be the same as that using a traditional current meter. The sensor depth and the water depth will be manually measured by the operator from the wading rod scales and entered into the control unit.

Those skilled in the art will appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A method of measuring discharge from a moving source of water, comprising:
    measuring depth at each of a plurality of vertical measurement locations;
    measuring velocity data at each of the plurality of vertical measurement locations, wherein measuring velocity data comprises:
        selecting a manual operation mode comprising measuring a single point water velocity, in response to the measured depth below a first threshold; and
        selecting an automated operation mode comprising measuring a velocity profile, in response to the measured depth greater than or equal to the first threshold;
    recording the velocity data and depth measured at each of the plurality of vertical measurement locations, the velocity data comprising the single point water velocity and/or the velocity profile; and
    calculating discharge based on the recorded velocity data and depth.

2. The method of claim 1, wherein the manual operation mode further comprises:
    placing a sensor at a first position;
    measuring a first distance from the first position to the bottom; and
    measuring the single point water velocity at the first position.

3. The method of claim 1, wherein the automatic operation mode further comprises:
    placing the sensor at a second position;
    measuring a second distance from the sensor to the bottom;
    measuring the single point velocity at the second position;
    determining a number and a size of profiling bins based on the second distance, in response to either the second distance exceeding a second threshold or the measured depth exceeding a third threshold; and
    measuring the velocity profile based on the determined profiling bins.

4. The method of claim 3, wherein the automatic operation mode further comprises measuring a third distance from the sensor to the surface.

5. The method of claim 1, wherein the first threshold is substantially 10 cm.

6. The method of claim 2, wherein the first position is substantially 60% of the measured depth.

7. The method of claim 3, wherein the second threshold is substantially 10 cm, wherein the third threshold is substantially 15 cm, and wherein the second position is substantially 5 cm below the surface of the water.

8. A system for underwater measurement, comprising:
    a transducer head configured to generate a plurality of beams, the transducer head configured to measure water depth, velocity at a single point, and a velocity profile;
    a control unit configured to select an automatic operation mode, the control unit further configured to select a manual operation mode, the control unit configured to determine a plurality of profiling bins based on the water depth measurement, the control unit configured to record velocity and depth data, the control unit configured to calculate discharge based on the recorded velocity and depth data; and
    a wading rod coupled to the transducer head, the wading rod configured to lower the transducer head below the surface of the water.

9. The system of claim 8, wherein one of the plurality of beams is a surface tracking beam.

10. The system of claim 8, wherein the system comprises four beams, wherein the first beam is configured to measure single point velocity, wherein the second and third beams are configured to measure the velocity profile, wherein the second and third beams are further configured to measure a distance to the bottom, and wherein the fourth beam is configured to measure a distance to the surface.

11. The system of claim 8, further comprising an orientation sensor configured to measure system tilt, wherein system tilt comprises pitch and roll.

12. A portable system for underwater measurement, comprising a transducer head and driver circuitry configured to generate a plurality of acoustic beams, the acoustic beams including an up-looking beam, a single cell measurement beam, and one or more down-looking current profiler beams, wherein the system can be configured for single point or current profile operation in dependence on measured water depth.

* * * * *